(12) United States Patent
Barbas et al.

(10) Patent No.: US 12,306,812 B2
(45) Date of Patent: May 20, 2025

(54) IN-DATABASE DATA CLEANSING AND INDEPENDENT STORE OF CLEAN DATA

(71) Applicant: INTERNATIONAL BUSINESS MACHINES CORPORATION, Armonk, NY (US)

(72) Inventors: Pedro Miguel Barbas, Dunboyne (IE); Shaikh Shahriar Quader, Oshawa (CA); Adrian Mahjour, Toronto (CA); Hima Patel, Bengaluru (IN); Nitin Gupta, Saharanpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/495,919

(22) Filed: Oct. 27, 2023

(65) Prior Publication Data
US 2025/0139068 A1 May 1, 2025

(51) Int. Cl.
G06F 16/215 (2019.01)
G06F 16/28 (2019.01)

(52) U.S. Cl.
CPC .......... G06F 16/215 (2019.01); G06F 16/284 (2019.01)

(58) Field of Classification Search
None
See application file for complete search history.

(56) References Cited

U.S. PATENT DOCUMENTS

| | | | |
|---|---|---|---|
| 6,965,888 B1 | 11/2005 | Cesare et al. | |
| 9,535,939 B2 | 1/2017 | Barber et al. | |
| 9,535,940 B2 | 1/2017 | Barber et al. | |
| 11,386,111 B1 | 7/2022 | Sommers | |
| 2005/0096950 A1* | 5/2005 | Caplan | G06Q 10/06395 705/7.41 |
| 2012/0143913 A1* | 6/2012 | Beier | H03M 7/46 707/E17.014 |
| 2012/0239670 A1* | 9/2012 | Horn | G06F 16/29 707/756 |
| 2014/0279972 A1* | 9/2014 | Singh | G06F 16/215 707/694 |
| 2014/0281247 A1* | 9/2014 | Loaiza | G06F 16/24552 711/126 |
| 2015/0088844 A1 | 3/2015 | Stigsen et al. | |

(Continued)

FOREIGN PATENT DOCUMENTS

| | | | |
|---|---|---|---|
| CN | 104182436 A | 10/2017 | |
| CN | 113515509 A | 10/2021 | |

(Continued)

OTHER PUBLICATIONS

Heman, Sandor et al., "Positional Update Handling in col. Stores," SIGMOD '10, Jun. 2010 pp. 1-12.

(Continued)

Primary Examiner — Irene Baker
(74) Attorney, Agent, or Firm — Teddi Maranzano, Esq.; Blanche E. Schiller, Esq.; Heslin Rothenberg Farley & Mesiti P.C.

(57) ABSTRACT

A cleansing operation is performed on data of a data structure to obtain clean data. The clean data is stored as part of the data structure; however, the clean data is independent of the data. A mapping is performed to provide a set of ordered data that includes the data and the clean data.

20 Claims, 7 Drawing Sheets

(56) References Cited

U.S. PATENT DOCUMENTS

| | | | |
|---|---|---|---|
| 2015/0278258 A1* | 10/2015 | Kienzle | G06F 3/0484 707/692 |
| 2016/0070725 A1 | 3/2016 | Marrelli et al. | |
| 2016/0171075 A1* | 6/2016 | Erenrich | G06F 16/285 707/738 |
| 2016/0275171 A1 | 9/2016 | Barber et al. | |
| 2017/0097970 A1 | 4/2017 | Bendel et al. | |
| 2022/0245103 A1* | 8/2022 | Elder | G06F 16/2456 |
| 2024/0020292 A1* | 1/2024 | Sehra | G06F 16/254 |
| 2024/0329949 A1 | 10/2024 | Chen et al. | |

FOREIGN PATENT DOCUMENTS

| | | |
|---|---|---|
| CN | 113672590 A | 11/2021 |
| CN | 114116739 A | 3/2022 |
| CN | 114138767 A | 3/2022 |

OTHER PUBLICATIONS

Oracle, "Loading the Initial Data Set for a Sun Master Index," https://docs.oracle.com/cd/E19509-01/820-3406/lidsevseispv_intro/index.html, downloaded from internet Jun. 8, 2023, pp. 1-36.

Wang, Xin et al., "Storing and Indexing RDF Data in a Column-Oriented DBMS," 2010 2nd International Workshop on Database Technology and Applications, Dec. 2010, pp. 1-4.

Talend, "Talend Data Quality: Trusted Data for the Insights You Need," https://www.talend.com/products/data-quality/?utm_source=stitch&utm_medium=referral&utm_campaign=internal, downloaded from internet Sep. 21, 2023, pp. 1-11.

Oracle, "Oracle® Data Profiling and Oracle Data Quality for Data Integrator Sample Tutorial 11g Release 1 (11.1.1.3)," Jan. 2011, pp. 1-35.

Lakshminarayan, Kamakshi et al., "Imputation of Missing Data in Industrial Databases," (Abstract Only), Nov. 1999, pp. 1-9.

Krishan, Sanjay et al., "AlphaClean: Automatic Generation of Data Cleaning Pipelines," May 2019, pp. 1-15.

Giannakopoulou, Stella et al., "CleanM: An Optimizable Query Language for Unified Scale-Out Data Cleaning," Proceedings of the VLDB Endowment, vol. 10. No. 11, Aug. 2017, pp. 1466-1477.

Yu, Feng et al., "OB-Tree: Accelerating Data Cleaning in Out-of-Core Column-Store Databases," 2017 IEEE 6th International Congress on Big Data, Jun. 2017, pp. 185-192.

Yu, Feng, et al., "Online Data Cleaning for Out-Of-Core Column-Store Databases with Timestamped Binary Association Tables," Jan. 2015, pp. 1-6.

Barbas, Pedro Miguel et al., "In-Database Data Cleansing," U.S. Appl. No. 18/495,952, filed Oct. 27, 2023, 42 pages.

List of IBM Patents or Patent Applications Treated as Related, Oct. 30, 2023, pp. 1-2.

Bhattacharjee, Arup Kumar, et al., "ETL based Cleaning on Database", International Journal of Computer Applications, vol. 105, No. 8, Nov. 2014, pp. 34-40.

Microsoft Computer Dictionary, 5th Edition, Microsoft Press, Redmond, WA, © 2002, pp. 141 and 145.

Ridzuan, Fakhitah, et al., "A Review on Data Cleansing Methods for Big Data", Procedia Computer Science, vol. 161, (Proc. of the 5th Information Systems International Conf., Surabaya, Indonesia, Jul. 24, 2019), pp. 731-738.

\* cited by examiner

300

| COLUMN GROUP A: FIRST NAME, LAST NAME ||
|---|---|
| FIRST 1 | LAST 1 |
| FIRST 2 | LAST 2 |
| FIRST 3 | LAST 3 |
| FIRST 4 | LAST 4 |
| FIRST 5 | LAST 5 |

310 points to the rows.

| COLUMN GROUP B: AGE |
|---|
| AGE 1 |
|  |
|  |
| AGE 4 |
| AGE 5 |

340 points to AGE 1 row.

| COLUMN GROUP C: CITY |
|---|
| CITY 1 |
| CITY 2 |
| CITY 3 |
| CITY 4 |
| CITY 5 |

370 points to the rows.

| TUPLE SEQUENCE NUMBER |
|---|
| 1 |
| 2 |
| 3 |
| 4 |
| 5 |

FIG. 3D

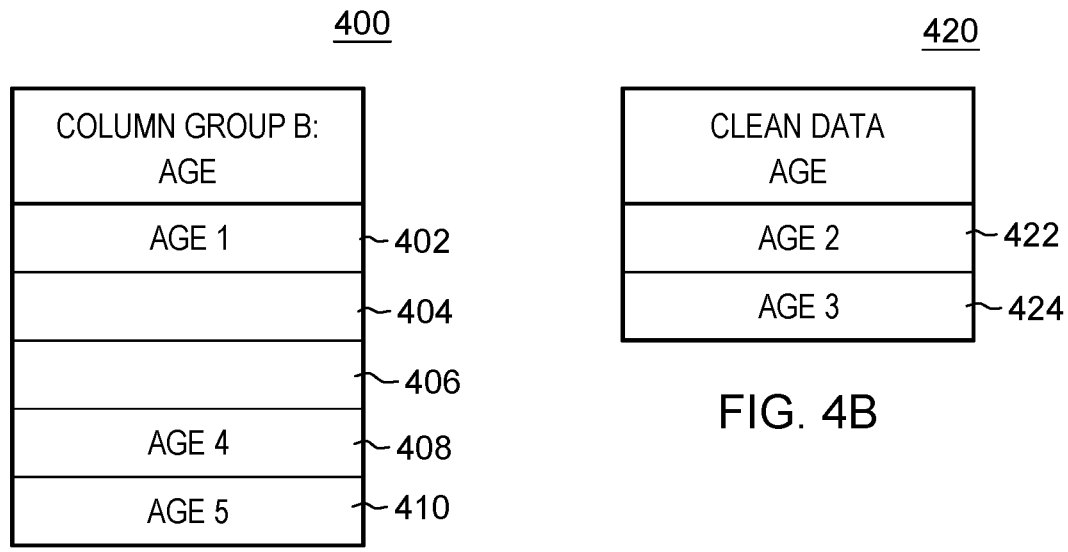
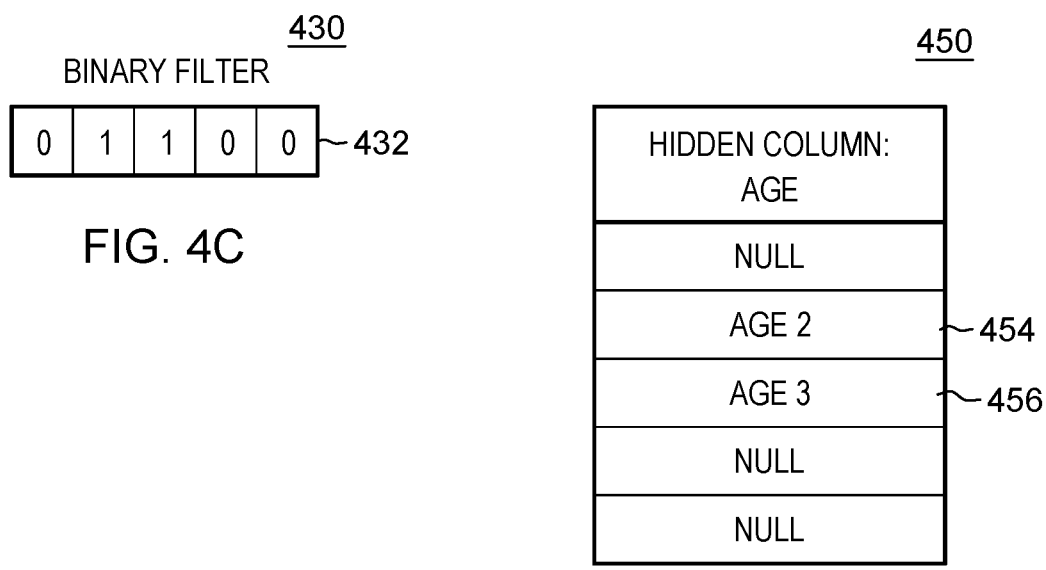

IN-DATABASE DATA CLEANSING AND INDEPENDENT STORE OF CLEAN DATA

BACKGROUND

One or more aspects relate, in general, to facilitating processing within a computing environment, and in particular, to facilitating data cleansing of databases of the computing environment.

Data cleansing or data cleaning is a process of detecting and correcting corrupt, inaccurate, missing, and/or duplicative data in a database, such as in database tables. The data to be corrected may be replaced, modified, deleted, added and/or imputed if missing, etc. Further, data cleansing may be used to transform data to provide a different form of the data, such as to standardize the data, normalize the data or provide another transformed form of the data and/or to encode the data.

Data cleansing is used for multiple reasons including to improve the accuracy of the data used in machine learning and artificial intelligence.

SUMMARY

Shortcomings of the prior art are overcome, and additional advantages are provided through the provision of a computer program product for facilitating processing within a computing environment. The computer program product includes at least one computer readable storage medium and program instructions collectively stored on the at least one computer readable storage medium. The program instructions collectively stored include program instructions to perform a cleansing operation on data of a data structure to obtain clean data, and program instructions to store the clean data as part of the data structure, wherein the clean data is independent of the data. The program instructions collectively stored further include program instructions to perform a mapping to provide a set of ordered data that includes the data and the clean data.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 3A-3C depict column groups of a table to be cleansed, in accordance with one or more aspects of the present disclosure;

FIG. 3D depicts one example of tuple sequence numbers for the table of FIGS. 3A-3C, in accordance with one or more aspects of the present disclosure;

FIG. 4A depicts one example of a column group in which in-database cleansing is to be performed, in accordance with one or more aspects of the present disclosure;

FIG. 4B depicts one example of clean data obtained during in-database cleansing, in accordance with one or more aspects of the present disclosure;

FIG. 4C depicts one example of a binary filter used to provide an ordered set of data, based on the data values and the in-database cleansing of the column group of FIG. 4A, in accordance with one or more aspects of the present disclosure;

FIG. 4D depicts another example of clean data obtained during in-database cleansing, in accordance with one or more aspects of the present disclosure;

DETAILED DESCRIPTION

Figure 1:
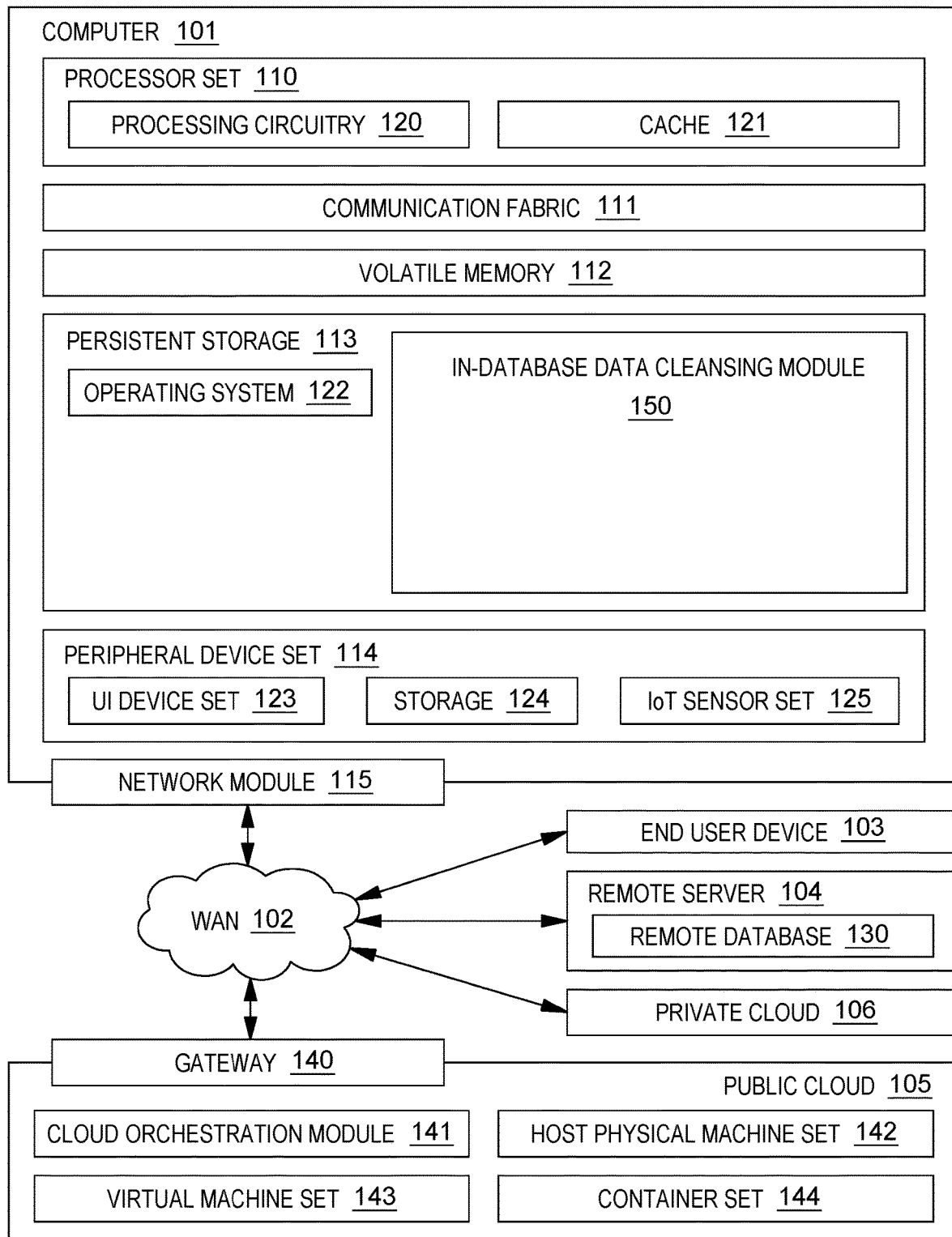
FIG. 1 depicts one example of a computing environment to incorporate, perform and/or use one or more aspects of the present disclosure.

In accordance with one or more aspects of the present disclosure, a capability is provided to facilitate processing within a computing environment. In one aspect, a data cleansing operation is created and used to cleanse data of a database, such as data of a relational database. In one example, data of a data structure (e.g., table) of a database is cleansed. In one example, the data structure (e.g., table) is defined in a column-major format.

In one aspect, a data cleansing operation is defined, and based thereon, clean data is produced and stored as part of the data structure. The clean data is independent from the other data (e.g., uncleaned data, original data, previous data, etc.) of the data structure in that it is, for instance, stored separately from the other data (e.g., in a different location within the data structure, such as a different column, column group, block (e.g., intra-image block or other block), etc.) and does not replicate the other data. A mapping between the other data and the clean data is provided.

As examples, the cleansing includes imputing missing data, correcting data, replacing data, modifying data, adding data, deleting data, transforming data (e.g., standardizing, normalizing, providing an average, mean, max, min, other operation, etc.) and/or encoding data, as examples. The stored clean data includes, in one example, only the clean data and does not replicate the other data. That is, the column, column group or block that includes the clean data does not include the other data (e.g., uncleaned data, original data, previous data, etc.). The cleansed data is used in many areas including machine learning and artificial intelligence, improving accuracy for a process that uses that data.

In one aspect, the data cleansing is performed by and within a database management system, providing in-database data cleansing. This allows one system (e.g., the database management system) to control the cleansing, providing data quality and security and reducing latency by not requiring a transfer of the data to another system outside of the database management system to cleanse the data.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) to, e.g., cleanse data and/or perform one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as an in-database data cleansing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
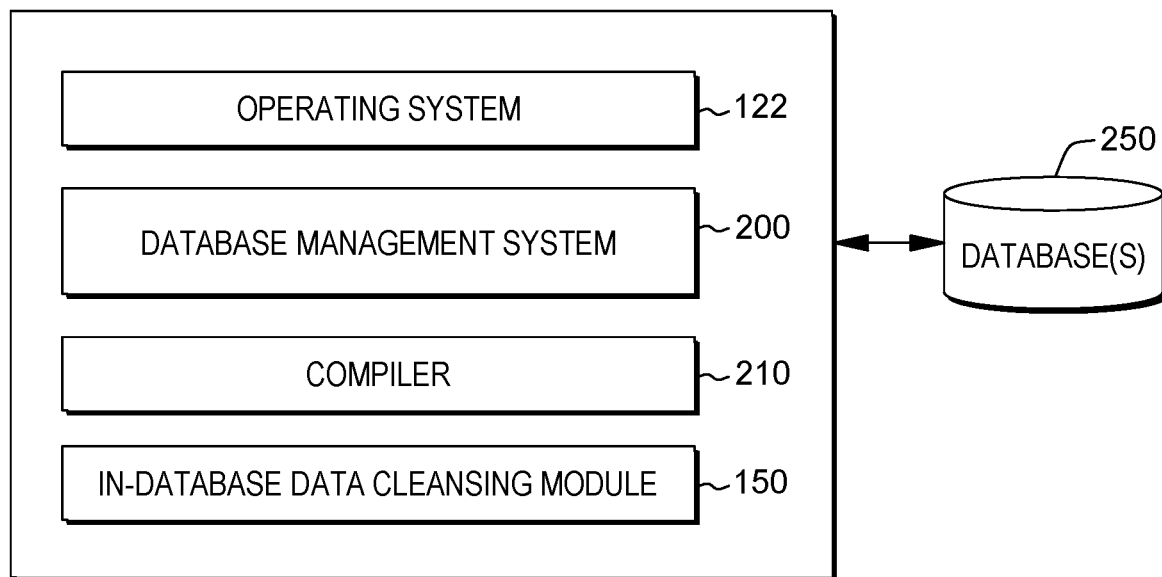
FIG. 2 depicts one example of a database management system to incorporate, perform and/or use one or more aspects of the present disclosure.

Further details relating to one or more components/modules of FIG. 1 used in accordance with one or more aspects of the present disclosure are described herein. For example, as shown in FIG. 1 and further described with reference to FIG. 2, persistent storage 113 includes an operating system, such as operating system 122. Running on operating system 122 may be a database management system, such as a database management system 200, that manages, for instance, storage, retrieval and/or access to data of one or more databases, such as databases 250. The databases may be internal and/or external to the database management system, which manages access, including queries of the databases. As one example, the databases (e.g., one or more of databases 250) are stored in memory (e.g., cache 121, volatile memory 112, etc.) and/or storage (e.g., persistent storage 113, storage 124, etc.).

In accordance with one or more aspects, users perform operations against the databases, including queries. These operations are facilitated, in one or more examples, using a compiler. Thus, in one example, persistent storage 113 also includes a compiler 210 for compiling program code and/or processing operations against the databases. In one example, compiler 210 is used, in accordance with one or more aspects of the present disclosure, to process queries (e.g., SQL (Structured Query Language) queries and/or other queries) to access the databases. Although the compiler and other systems/modules are depicted in persistent storage 113, this is only one example. One or more of the compiler, other code, systems and/or modules may be in other storage and/or memory.

In accordance with one or more aspects of the present disclosure, a database management system (e.g., database management system 200) uses in-database data cleansing module 150 to cleanse data of one or more databases and to store the cleansed data for retrieval when requested. In one example, database management system 200 provides in-database cleansing of database data structures, such as tables, that are configured as column-major tables. In one example of a column-major database, each page (of e.g., memory or storage) holds values for only one column, or column group. In such a column store, the columns are disposed in sequence, as this is what permits records to be reconstructed together without the need to keep a row identifier with each value. One example of such a table is described with reference to FIGS. 3A-3C.

Referring to FIGS. 3A-3C, a table, such as a Table Customers, is column organized, and includes the following column groups, as an example: Column Group A (300; FIG. 3A), which includes, e.g., first name, last name; Column Group B (330; FIG. 3B), which includes, e.g., age; and Column Group C (360; FIG. 3C), which includes, e.g., city of residence. Column Group A has two columns, and each of Column Group B and Column Group C has one column, in this example. A column group may have one or more columns. A column group having one column may be referred to as a column. Many examples are possible.

The data values (e.g., data values 310, 340 and 370) of each column are logically in sequence, as indicated by a set of tuple sequence numbers (TSNs) 390, an example of which is depicted in FIG. 3D. Although example columns and/or data values are provided, a table may have additional, fewer and/or other columns. Further, each column may have additional, fewer and/or other data/data values. Many examples and variations are possible.

In one example, each column group may be divided into one or more blocks based on the number of data values stored in the column group. Each block may include up to a predetermined number of data values. Each data value may be assigned a tuple sequence number.

A column group (or a column of a column group) may be missing certain information (e.g., a cell of a column group or column is left blank or null), or it may be desired to derive information from the information in a column group (or column). As an example, if a column group includes percents (%; e.g., 90%), it may be desirable to derive decimal values from the percents (e.g., 0.9). Many other derivations, transformations, standardizations and/or encodings may be performed, as well as corrections, modifications, additions, deletions, etc. There are many examples and variations.

In one particular example, as shown in the Customers Table of FIGS. 3A-3C, Column Group B 330 (FIG. 3B), in one example, is missing ages for two customers. Therefore, in one example, clean data (e.g., Age 2, Age 3) is obtained (e.g., generated, derived, provided, predicted, hypothesized, etc.) and stored in the table. As an example, an imputation cleansing operation is performed to include those values in the table. For instance, the clean data is obtained by taking a maximum (max) and a minimum (min) of the ages in the table; however, in other examples, other operations may be used to obtain the missing data. In one example, the clean data is stored independently from Column Group B. As an example, another column, column group or block is created that includes only Age 2 and Age 3. It does not include, in this example, Age 1, Age 4 or Age 5 since the uncleaned data is not replicated.

In accordance with one or more aspects of the present disclosure, clean data is obtained and stored for future retrieval and use by performing an automated data cleansing process that creates clean data for each column to be cleansed. The clean data is created and stored as, e.g., a new column, column group or block (e.g., intra-image block, other block, etc.) by applying a data cleansing operation on an existing column or column group in the table. The creation of the clean data, while preserving the existing column or column group, ensures efficient query processing and data compression of such column-major databases. At the same time, existing database workloads that rely only on the existing (e.g., original) set of columns are not impacted by these additional columns, column groups, blocks, etc.

One challenge of creating, for instance, a new column, a new column group, or a block (e.g., an intra-image block) within a column is due to a breach of the tuple sequence numbers, because not all rows within a column require a cleansing operation. For example, assume the missing values in Column Group B: Age are to be imputed. For this, values are generated for only the empty cells for Column Group B, while preserving the existing non-empty cell values. In this case, by creating a new column, column group or block for this column, the original tuple sequence number order is broken and lost (e.g., original order of the tuple sequence numbers of 2 and 3 will be 1 and 2 for a new column, column group or block). If, in the new column, column group or block, both the original cell values and the imputed cell values for the missing cells are kept, cell values are duplicated that are already available in the original column. This is to be avoided. Thus, in accordance with an aspect of the present disclosure, a new column, column group or block is created that includes only the data values for the missing cells. In one example, if, for instance, the cleansing operation is imputation in which missing values are generated, then the new column, column group or block is a different size than the existing column, column group or block. As an example, it has fewer cells or data values than the existing column, column group or block. However, in another example, if the cleansing operation is, for instance, a transformation from one value format (e.g., percent %) to another value format (e.g., decimal 0.0), then the new column, column group or block may be the same size as the existing column, column group or block, but the data values would be different and not duplicative of the existing data.

Based on the existing data and the clean data, an ordered set of data is created. This is accomplished by employing, in accordance with an aspect of the present disclosure, a mapping that maps the existing data and the clean data.

In one embodiment, when the clean data is generated, a map (also referred to as an intra-image key-map) is provided that indicates whether a data record is of the existing data or the clean data and the order of the data record. An intra-image key-map can be implemented in a number of ways, including, for instance, through a binary filter, an array, etc., and is stored in the original record order (i.e., not partitioned). As an example, referring to FIG. 4A, in Column Group B: Age (400), the original data disposition is given by the set "Age 1 (402), null (404), null (406), Age 4 (408), Age 5 (410)," and referring to FIG. 4B, the data disposition of clean data 420, e.g., in a new column, column group or block (with imputation as the cleansing operation), is given by the set "Age 2 (422), Age 3 (424)." Consequently, as depicted in FIG. 4C, in one example, a binary filter 430 (an example of a map) includes, for instance, 01100 (432), where the leftmost position, in this example, corresponds to position or cell 1 of the column group, and a 0 in a particular position of the filter indicates the data value (e.g., age) is to be obtained from the existing data and a 1 indicates the data value (e.g., age) is to be obtained from the clean data. The data output of such a mapping is then the set "Age 1, Age 2, Age 3, Age 4, Age 5". As a particular example, assume the ages in Column Group B are 47, null, null, 20 and 35. Also, assume an imputation operation of Min and Max is performed for that column. In that example, the data output of such a cleaning and mapping is the set "47, 20, 47, 20, 35." This final set represents the result of the cleansing operation (impute using Min and Max) performed on Table Customer for column "Column Group B."

Although in the above example, the cleansing operation is imputation and the imputation uses Min and Max operations, many other cleansing operations including, but not limited to, adding, deleting, replacing, modifying, transforming, standardizing, encoding and/or other cleansing operations may be performed. Further, imputation operations other than Min and Max may be used to determine values for the missing data. Many examples and variations are possible.

In one embodiment, constructs are used in implementing data cleansing (e.g., automated data cleansing) of data in a data structure (e.g., table) of a database system (e.g., a relational database system). In one example, a user of a database system may request access to a table in the database system through an SQL query statement. As an example, the user (e.g., via an interface, process, program, etc.) issues an SQL query statement, which is received by a database compiler. A parser of the compiler splits the statement into several components for proceeding to compilation and transforms the components into a compiler definition.

In accordance with one or more aspects, during compilation a capability is provided to validate (e.g., automatically) for each reference to a table if a cleansing function has been configured for pre-processing the data for, e.g., machine learning models, in which the same cleansing function may be stored and defined in the database (e.g., database metadata catalogs). If a cleansing function has been defined, the function evaluates if there are any data references of any tables from the current SQL statement. If the validation matches any data associated with the cleansing operation within the SQL statement, the cleansing operation is then applied to the SQL statement. After the validations (e.g., all the validations) for the table have been processed, the cleansing function creates a dynamic pseudo-view object representation of the cleansing operation for the table. After the tables have been evaluated for cleansing and the resultant pseudo-view is created, the pseudo-view constructs are injected into the SQL statement representation and then passed to the subsequent SQL compiler processing logic for normal processing. This means that normal query rewrite and/or optimization operations performed by the SQL compiler are not affected by the cleansing work, e.g., operations like imputation, normalization, standardization, encoding, etc. The result is then presented to the user.

In another embodiment, as shown in FIG. 4D, instead of creating a new column, column group or block with only cells for the clean data and using a construct, such as SQL, a cleansing operation produces a hidden column 450 that includes, for instance, the clean values (454, 456) and "NULL" for the remaining data values. This column is stored as part of the data structure (e.g., table) but independent of the original or uncleansed data, and used when requested. For instance, it may be referenced by a construct, such as a CASE expression, an example of which is: SELECT C1, C2, CASE WHEN HIDDEN_CLEAN_C3 IS NULL THEN C3 ELSE HIDDEN_CLEAN_C3 END AS C3 FROM T1; or a construct, such as a COALESCE expression, an example of which is COALESCE_CLEAN_C3, C3). In this embodiment, instead of using a map, such as the intra-image key-map, the mapping is performed by a selected construct, e.g., CASE or COALESCE, as examples.

Figure 5:
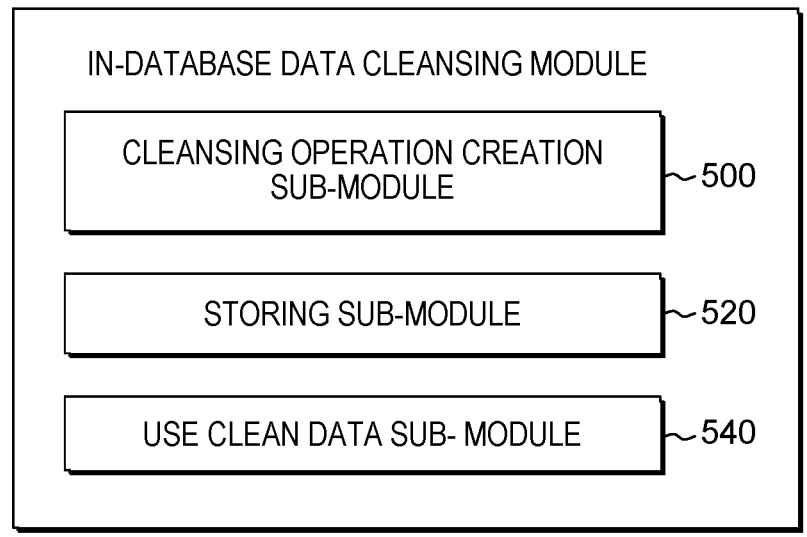
FIG. 5 depicts one example of sub-modules of an in-database data cleansing module of FIG. 1, in accordance with one or more aspects of the present disclosure.

In one or more aspects, to perform in-database data cleansing, the database management system uses an in-database data cleansing module, such as in-database data cleansing module 150, as described herein. As one example, referring to FIG. 5, an in-database data cleansing module (e.g., in-database data cleansing module 150) includes various sub-modules to be used to facilitate and/or control in-database cleansing and/or to perform tasks relating thereto. The sub-modules are, e.g., computer readable program code (e.g., instructions) in computer readable media, e.g., storage (persistent storage 113, cache 121, storage 124, other storage, as examples). Although, as an example, in-database data cleansing module 150 is depicted in FIG. 1 in persistent storage 113, one or more sub-modules may be in other storage, etc. Many variations are possible.

The computer readable media may be part of one or more computer program products and the computer readable program code may be executed by and/or using one or more devices (e.g., one or more computers, such as computer(s) 101; one or more servers, such as remote server(s) 104; one or more end user devices, such as end user device(s) 103; one or more processors or nodes, such as processor(s) or node(s) of processor set 110; processing circuitry, such as processing circuitry 120 of processor set 110; and/or other devices, etc.). Additional, fewer and/or other computers, servers, end user devices, processors, nodes, processing circuitry and/or other devices may be used to execute one or more of the sub-modules and/or portions thereof. Many examples are possible.

Example sub-modules of in-database data cleansing module 150 include, for instance, a cleansing operation creation sub-module 500 to create and use a cleansing operation to cleanse a database and obtain clean data; a storing sub-module 520 to store the clean data obtained based on the cleansing operation; and a use clean data sub-module 540 to obtain results that include the clean data, in accordance with one or more aspects of the present invention. Additional, fewer and/or other sub-modules may be used to perform cleansing and/or tasks related thereto. Other variations are possible. Although various sub-modules are described, an in-database data cleansing module, such as in-database data cleansing module 150, may include additional, fewer and/or different sub-modules. A particular sub-module may include additional code, including code of other sub-modules, less code, and/or different code. Further, additional and/or other modules may be used to facilitate database cleansing and/or perform related tasks. Many variations are possible.

Figure 6:
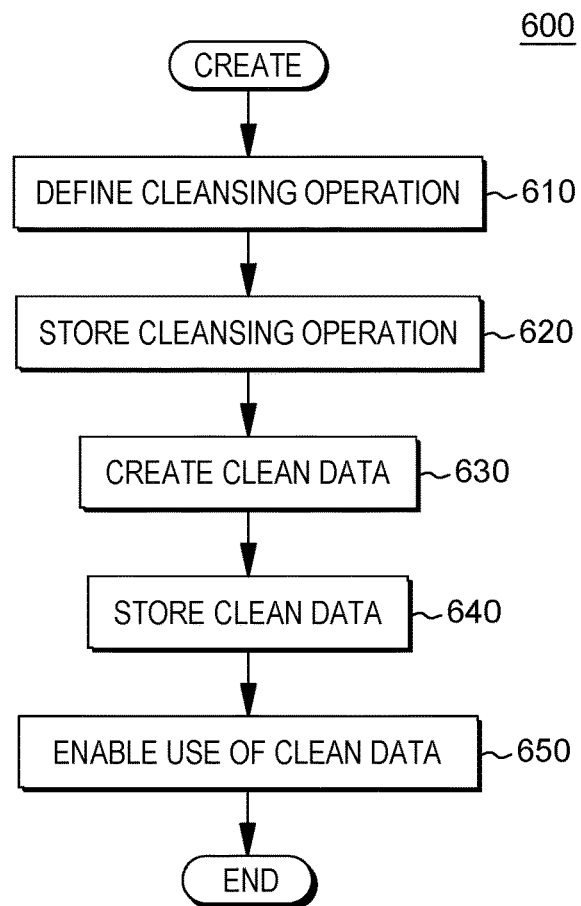
FIG. 6 depicts one example of a create process to create and use a data cleansing operation, in accordance with one or more aspects of the present disclosure.
Figure 7:
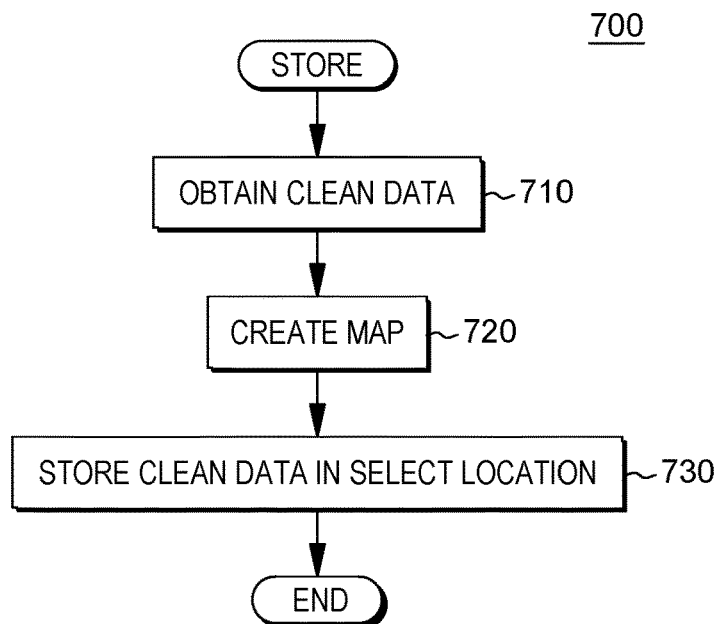
FIG. 7 depicts one example of a store process to store clean data obtained based on a data cleansing operation, in accordance with one or more aspects of the present disclosure.
Figure 8:
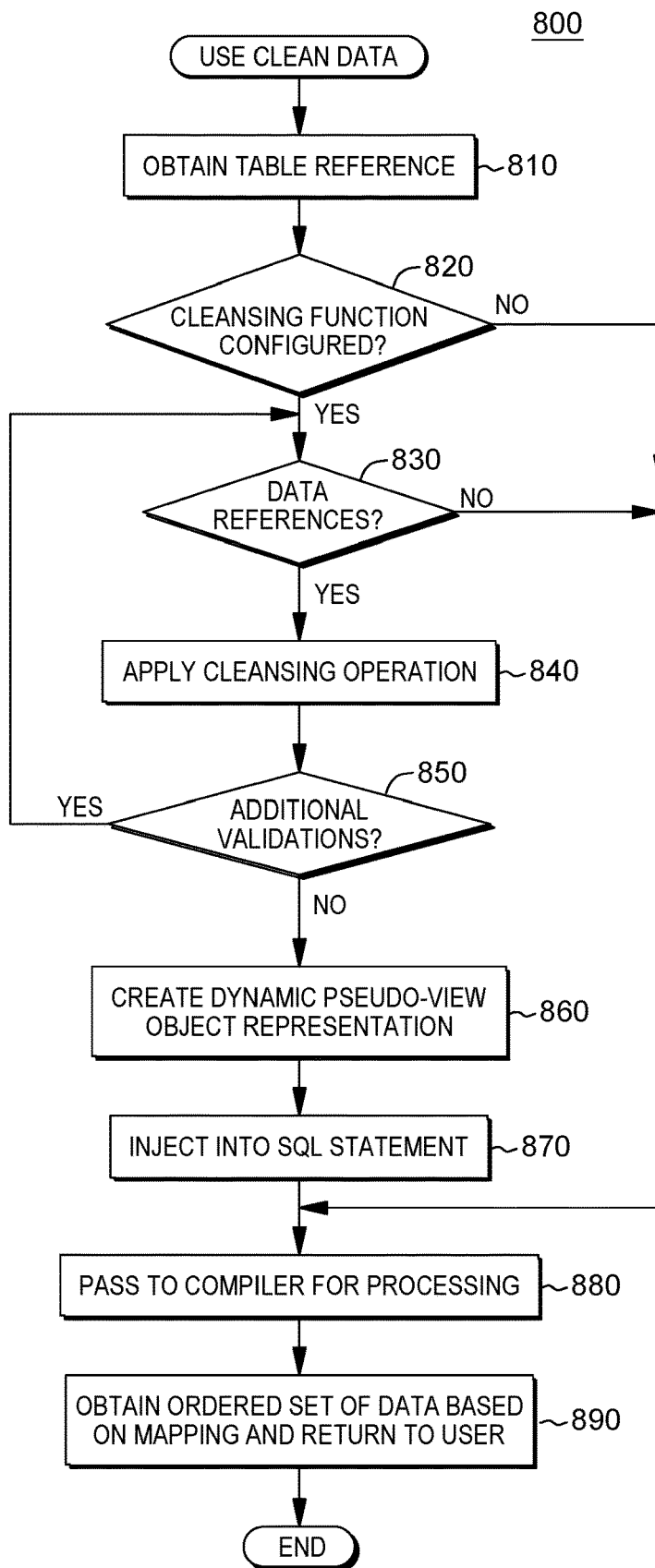
FIG. 8 depicts one example of using clean data, in accordance with one or more aspects of the present disclosure.

One or more of the sub-modules are used, as described herein, to create a cleansing operation, perform cleansing using the cleansing operation to provide clean data, store the clean data and use the clean data, as described herein with reference to FIGS. 6-8.

One example of creating and using a cleansing operation is described with reference to FIG. 6. In one example, a create cleansing process (e.g., a create cleansing process 600) is implemented using one or more of the sub-modules (e.g., one or more of sub-module 500-520) and is executed by a device (e.g., computer (e.g., computer 101, other computer, etc.), a server (e.g., server 104, other server, etc.), an end user device (e.g., end user device 103, other end user device, etc.), a processor, node and/or processing circuitry, etc. (e.g., of processor set 110 or other processor sets), and/or one or more other devices, etc.). Although example computers, servers, end user devices, processors, nodes, processing circuitry and/or devices are provided, additional, fewer and/or other computers, servers, end user devices, processors, nodes, processing circuitry and/or devices may be used for creating and using a cleansing operation and/or other processing. Various options are possible.

In one example, referring to FIG. 6, create cleansing process 600 (also referred to as process 600) includes defining 610 a cleansing operation to be used to cleanse selected data. The cleansing operation is defined, for instance, in the database for a selected object, such as a selected table (e.g., Table Customer or any other table in the database). Example cleansing operations that may be defined include imputation of missing values; adding missing values; replacing, modifying, deleting and/or correcting data values; transforming data values; normalizing data values; standardizing data values; encoding data values, etc. Many cleansing operations may be performed and those described herein are just examples and not meant to be limiting in any way.

One example syntax of a cleansing operation is provided below. In this example, the syntax indicates that those in recipient-authorization-name can create cleansing operations to table table-name, on columns columns-name, where access-condition is valid. As an example:
CREATE AUTOMATED CLEANSING operation-name
ON TABLE table-name
INCLUDE COLUMNS columns-name/ALL
INCLUDE OPERATIONS operations-name/ALL
WHERE access-condition
FOR RECIPIENT recipient-authorization-name
EXCEPT RECIPIENT recipient-exception-authorization-name
CREATE;
where, as an example:
operation-name is the name of the cleansing function that is being created. The operation-name is, in one example, unique and is not to be the same as a previous operation that already exists;

table-name is the name of the table where the cleansing operations are to be performed;

columns-name are the names of the columns where the cleansing function is to be performed. ALL for all columns in the table;

operations-name are the names of the operations available for cleaning operations. ALL for all operations available—this includes, as examples, imputation, normalization, standardization, transformation and encoding. However, in other embodiments, it may include addition, deletion, modification, correction, other transformations, other cleansing operations, etc.;

access-condition is the result of a search condition where the cleansing function has its domain (e.g., on insert, update, etc.);

recipient-exception-authorization-name is the name of the recipient that does not have cleansing rights to table table-name on columns columns-name with access-condition; and recipient-authorization-name is the name of the recipient that has authorization access to table table-name on columns columns-name with access-condition.

Additional, fewer and/or other information/syntax may be defined for the selected cleansing operation.

In one example, process 600 stores 620 the defined cleansing operation. As an example, it is stored in the database metadata catalog, which is, for instance, located in memory and/or in storage (e.g., persistent storage 113, storage 124, etc.).

Based on defining a cleansing operation (also referred to as a cleansing operation command), process 600 may execute the operation (e.g., automatically). As an example, "CREATE" in the above example syntax, triggers a response to execute the operation and automatically creates 630 the clean data making it readily available to use.

In one embodiment, based on creating the clean data, process 600 stores 640 the clean data. As an example, it is stored in the same data structure (e.g., table) as the existing data. For instance, it is stored in the Table Customers but in a separate column group, column or block than the existing data.

To leverage usage of the cleansing operation, process 600 (e.g., automatically based on a defined criterion, and/or via user input) executes 650 an enable of the cleansing operation. For example:

ALTER AUTOMATED CLEANSING operation-name ENABLE;

This enables usage of the cleansing operation (e.g., usage of the clean data) by, for instance, executing an SQL statement (or other construct) referencing tables affected by the cleansing command. Other mechanisms may be used to enable the cleansing operation, including non-SQL mechanisms and/or syntax. The above is provided as only one example and is not meant to be limiting in any way.

If it is desired (e.g., by the user or a predefined criterion) to return to the original data, process 600 disables the cleansing operation. For example:

ALTER AUTOMATED CLEANSING operation-name DISABLE;

This turns off usage of the cleansing operation. Other mechanisms may be used to turn off usage of the cleansing operation (e.g., usage of the clean data), including non-SQL mechanisms and/or syntax. The above is provided as only one example and is not meant to be limiting in any way.

One example of SQL syntax for creating, enabling and/or disabling a cleansing operation to impute age in a database table column is described below:

CREATE AUTOMATED CLEANSING impute_age
ON TABLE CUSTOMERS
INCLUDE COLUMNS AGE
INCLUDE OPERATIONS IMPUTE
WHERE INSERT, UPDATE
FOR RECIPIENT dbuser1, dbuser2
EXCEPT RECIPIENT dbuser3
CREATE;
ALTER AUTOMATED CLEANSING IMPUTE_AGE
ENABLE;
ALTER AUTOMATED CLEANSING impute_age
DISABLE;

Although in the example described herein, age is being imputed, this is only one example. Other column data may be imputed. Further, additional and/or other cleansing operations may be performed. Many examples and variations are possible.

As indicated, in one embodiment, based on creating the clean data, the clean data is stored in the data structure (e.g., table). In one example, the clean data is stored independently of the original data in that it is in a separate column, column group or block. Further, in one example, it is hidden in that a standard query does not access this data; it is accessed when clean data is authorized or requested by an authorized user, as an example (e.g., via an ENABLE by an authorized user).

Further details relating to storing clean data are described with reference to FIG. 7. In one example, a store clean data process (e.g., a store clean data process 700) is implemented using one or more of the sub-modules (e.g., one or more of sub-modules 500-520) and is executed by a device (e.g., computer (e.g., computer 101, other computer, etc.), a server (e.g., server 104, other server, etc.), an end user device (e.g., end user device 103, other end user device, etc.), a processor, node and/or processing circuitry, etc. (e.g., of processor set 110 or other processor sets), and/or one or more other devices, etc.). Although example computers, servers, end user devices, processors, nodes, processing circuitry and/or devices are provided, additional, fewer and/or other computers, servers, end user devices, processors, nodes, processing circuitry and/or devices may be used for storing clean data and/or other processing. Various options are possible.

In one example, referring to FIG. 7, store clean data process 700 (also referred to as process 700) obtains 710 the clean data (e.g., based on defining and executing a cleansing operation), and in one example, creates 720 a map representing the existing and clean data. For instance, process 700 creates a binary filter (an example of a map) representing the existing and the clean data. As described herein, in one example, the filter is positional and a 0 in a position indicates existing data and a 1 in the position indicates clean data. The map is saved in, for instance, the database system.

Further, in one example, process 700 stores 730 the clean data in a selected location independent from the original or existing data. The selected location may be a new block (e.g., intra-image block) of a column, a new column, a new column group, etc. within the data structure (e.g., table) holding the original data. The data structure (e.g., table) may be stored in memory or storage, as examples.

One example of using the clean data is described with reference to FIG. 8. In one example, a use clean data process (e.g., a use clean data process 800) is implemented using one or more of the sub-modules (e.g., sub-module 540) and is executed by a device (e.g., computer (e.g., computer 101, other computer, etc.), a server (e.g., server 104, other server, etc.), an end user device (e.g., end user device 103, other end user device, etc.), a processor, node and/or processing circuitry, etc. (e.g., of processor set 110 or other processor sets), and/or one or more other devices, etc.). Although example computers, servers, end user devices, processors, nodes, processing circuitry and/or devices are provided, additional, fewer and/or other computers, servers, end user devices, processors, nodes, processing circuitry and/or devices may be employed for using the clean data and/or other processing. Various options are possible.

In one example, referring to FIG. 8, use clean data process 800 (also referred to as process 800) obtains 810 a table reference (e.g., via an SQL query, another query, etc.), and automatically determines 820 whether a cleansing function is configured for the table being referenced. This may be determined from checking the database metadata catalogs for a cleansing function for the table or by checking whether a cleansing function has been enabled, as examples.

Based on determining that a cleansing function has not been configured, then process 800 proceeds 880 to typical compiler processing without cleansing. However, based on determining that a cleansing function has been configured for the table (and, in one example, that the user is authorized to use the cleansed data), process 800 determines 830 whether there are any data references for data that may have cleansed data (e.g., is a column group being queried for which there is a corresponding column group with cleansed data). If there are no data references for data that may have cleansed data, process 800 proceeds 880 to typical compiler processing without cleansing. However, based on there being one or more data references for data that may have corresponding clean data, process 800 applies 840 the cleansing operation to, e.g., the SQL statement (or other query construct).

As an example, cleansing operations are configured, in one embodiment, for specific columns in database tables. When a user sends, e.g., an SQL query, the query refers to one or more tables and may further refer to specific columns in these tables. In one or more aspects, based on receiving an SQL query, request for data, the database management system performs two checks: Is any of the referenced tables in the SQL query configured with a data cleansing function? If yes, is the user requesting one or more columns from the table where the cleansing operation is applicable? For instance, assume a table, Table1 has two 2 colunms: ColumnA and ColumnB and a cleansing operation is defined on ColumnB, but not ColumnA. A user submits an SQL query that requests data from Table1's ColumnA. In that case, the cleansing operation is not performed. However, if the user requests data from ColumnB of Table1, the cleansing operation is executed.

Process 800 checks 850 whether there are any further validations. If there are further validations, process 800 returns to checking 830 for data references; otherwise, if there are no further validations, process 800 creates 860 a dynamic pseudo-view object representation of the cleansing operation for the table. For example, if the user sends an SQL query that invokes execution of a cleansing operation on a table, a pseudo-view is created that includes the cleansed data and that pseudo-view is provided in a query response to the user. To eliminate data duplication of the data values that are not affected by the cleansing operation, in one example, only a copy of the changes in the original data values is made and an intra-image key-map, as an example, is used to create the pseudo-view that combines the cleansed values and the unchanged values from the affected columns into a single view.

Process 800 injects 870 the pseudo-view constructs into, e.g., the SQL statement. For instance, the SQL statement is altered (e.g., auto-generated) to access the clean data, as well as the original data. Process 800 then passes 880 the revised SQL statement to the compiler for processing. In one example, an auto-generated pseudo-view is embedded in the SQL during the pre-processing or re-writing of the SQL expression. For example, assume there is a table, Table1, with a column of five values: [2, 3, 4, 500, 600]. A cleansing operation is defined on this column. The operation finds that the first three values [2, 3, 4] in this column are valid and so no cleansing is performed on those values. However, the operation finds that the last two values [500, 600] are invalid and are to be replaced with [5, 6]. In the cleansed data, the correct values for the last two elements in the column are saved (e.g., [5, 6]) but not the first three values, and an intra-image key-map, as an example, is created with the logic to combine data values from two copies of the column—the original copy and the changed copy. The final combination of values from the two copies of the column—the original copy and the changed copy—is the pseudo-view in SQL.

In one example, the compiler processes the revised SQL statement, and process 800 obtains 890 a result that includes an ordered set of data retrieved from the existing data, the cleansed data and/or both. For instance, the compiler uses the mapping to determine from which column group, column or block the data is to be retrieved to satisfy the query. As an example, if the query requests the five values in Table1, then the first three values are retrieved from the existing column and the next two values are retrieved from the clean data, providing an ordered set of, e.g., "[2, 3, 4, 5, 6]". As another example, if the query requests the age of customers 1-5 in the Table Customer described herein, then the data is retrieved from the existing column group (e.g., Column Group B 400) and the clean data column group or block (e.g., Clean Data 420), and an ordered set of, e.g., "Age 1, Age 2, Age 3, Age 4, Age 5" is generated and returned to the user. Many other examples are possible.

In one or more aspects, a capability is provided to facilitate processing within a computing environment by providing a cleansing operation to cleanse data, providing more accurate and usable data for use in many processes, including, but not limited to, machine learning and artificial intelligence models and processes. For instance, the cleansed data may be used to improve machine learning models by having up-to-date and/or more accurate data. The improved machine learning models and/or artificial intelligence may be used in many processes including medical procedures, manufacturing, computing, etc.

In one or more aspects, the cleansing operation is automated. For instance, based on a cleansing operation being defined and stored in the database (e.g., database metadata catalogs), the cleansing operation is automatically performed generating clean data that is stored in the data structure and available for future use. Further, based on a user enabling use of the cleansing operation for its operation (e.g., query), the clean data is automatically provided to the user absent the user modifying its operation (e.g., query statement, such as an SQL query statement).

In one or more aspects, instead of using, for instance, SQL to create the cleansing operation, perform the cleansing operation and/or obtain the clean data, a trigger mechanism may be used to automatically trigger creation, storage and/or usage of the cleansing operation. For instance, the database management system may be configured to trigger creation, storage and/or usage of a cleansing operation based on one or more defined conditions occurring within the database management system, such as an update of a database or another defined condition. In one example, the trigger mechanism uses one or more hidden columns (e.g., hidden column 450).

In one example, in using the trigger feature, the users of the database management system are able to associate the automated execution of some operation based on some events taking place in the database management system. As an example, an event may be an application inserting a new record into a database table, which has one or more of its columns configured for cleansing. The users may define a trigger that instructs the database management system to automatically apply the data cleansing logic, as per one or more aspects of the present disclosure, on the new data records being inserted into the database. The trigger mechanism helps with automating applying the cleansing logic on fresh data being added to the database without requiring any ongoing manual efforts.

In one or more aspects, a capability for creating automated data science cleaning operations for data stored in column oriented relational databases is provided. In one or more aspects, a mechanism is provided that can automatically cleanse data stored in a relational database for a data science project. As an example, standard data cleaning operations are mapped to, e.g., SQL or database operations while preserving the data structure.

Further, in one or aspects, a capability is provided for improving the quality of data inside the database without copying data to an external cleansing system, and by storing the cleaned copy of the data with minimum or no additional storage requirements, improving data cleaning performance by not requiring data transfer, and/or offering data cleaning operations that do not downgrade the performance of the database itself.

In one aspect, the capability is user-friendly in that, for instance, SQL skills and/or other construct skills, are used instead of requiring new or more complicated skills.

In one or more aspects, each user can perform customized cleaning and the differential metadata can be stored in a metadata table. Each user can store their own version of cleaned data.

In one or more aspects, an ability is provided to create, preserve, and execute data cleaning pipelines—which include cleaning operations and metadata—natively inside the database using, for instance, extended SQL constructs and/or other constructs.

In one example, a significant amount of time is spent in data cleaning and preparing the data for certain tasks, such as machine learning tasks. Previously, this has been a significant bottleneck for data science projects. Thus, in accordance with one or more aspects, data cleansing is provided, and a data cleaning pipeline is created inside one or more relational databases without moving the data to external systems to perform the cleansing. This provides, for instance, an ability to create and execute a data cleaning pipeline natively inside the database using, e.g., extended SQL constructs, which accelerates the data science project by eliminating the network latency of data movement. Further, this allows, for instance, the data to remain in its source so no additional data governance measures are to be taken while cleaning and preparing the data for machine learning tasks and/or other tasks; and the data cleaning process can scale using the database's native parallelism and distributed query processing capabilities (e.g., multiple users can access clean data in parallel). Additional and/or other benefits are also provided.

In one or more aspects, a single automated cleansing function is defined for one or more (even a large number of tables). Therefore, a table lookup for each row in the target table is avoided, and no rules table or application logic is needed. Further, one or more aspects of the disclosure is insert/update independent, i.e., the data cleaning function automatically handles new data in the table.

In one or more aspects, the data cleaning operations are translated into, for instance, native SQL operations, and no external processing and execution runtime is needed on the data. As an example, an SQL query is sent to the view that is created and SQL results are returned with clean data. One or more aspects are integrated with the database management system, and as such, a transfer of data between systems to perform the cleansing is avoided, as well as application code to trigger execution of a data cleansing tool.

One or more aspects of the present disclosure are tied to computer technology and facilitate processing within a computer, improving performance thereof. For instance, processing within a computing environment is improved by providing a capability to perform in-database data cleansing, which reduces storage costs in saving the cleansed data, reducing latency by not requiring data to be transferred for the cleaning process, and increases performance by eliminating bottlenecks and latencies in providing improved results that include the cleansed data. Processing within a processor, computer system and/or computing environment is improved.

In one or more aspects, a capability for efficiently storing clean data alongside the original data within an existing table storage structure is provided. A robust capability is provided for seamlessly integrating cleansed data into an existing table storage structure. One or more aspects provide a technique of conducting automatic in-database data cleansing within, e.g., a column-oriented database, by, for instance, maintaining intra-image blocks associated with individual columns. One or more aspects enable creation of automated data science cleaning operations for data stored within a column-oriented relational database (e.g., for data preparation for machine learning tasks). In one or more aspects, data stored in a relational database is automatically cleansed for a data science project. Data cleaning operations are mapped to, e.g., SQL or database operations while preserving the data structure. In one or more aspects, a cleaned copy of the data is stored with minimal or no additional storage requirements, optimizing data cleaning performance by eliminating data transfer for the cleaning operation. In one or more aspects, a capability is provided to create, maintain, and execute data cleaning pipelines, which include cleaning operations and metadata, directly within the database using, e.g., extended SQL constructs.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other techniques may be used to cleanse data. Further, other cleansing operations and/or constructs may be used. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer readable storage medium and program instructions collectively stored on the at least one computer readable storage medium, the program instructions collectively stored comprising:
        program instructions to automatically perform, using a database management system, a cleansing operation on data of a data structure stored in the database management system obtain clean data;
        program instructions to store, using the database management system, the clean data as part of the data structure, wherein the clean data and the data are stored in the data structure, and the clean data is stored in the data structure separately from the data stored in the data structure;
        program instructions to perform a mapping of the data and the clean data provide a set of ordered data that includes the data and the clean data, the set of ordered data including a plurality of data positions, and where the mapping uses a map to select between the clean data and the data to be stored in a data position of the plurality of data positions of the set of ordered data; and
        program instructions to provide the set of ordered data, the set of ordered data to used in replying to query requests.

2. The computer program product of claim 1, wherein the program instructions to perform the mapping include program instructions to generates the map based on the data and the clean data to be used to perform the mapping.

3. The computer program product of claim 2, wherein the map is a binary map in which one binary value in a particular position in the map indicates a data value from the data is to be selected and placed in that corresponding data position in the set of ordered data and another binary value at the particular position indicates a clean data value from the clean data is to be selected and placed in that corresponding data position in the set of ordered data.

4. The computer program product of claim 1, wherein the program instructions to perform the mapping include using at least one construct to map the data and the clean data to provide the set of ordered data.

5. The computer program product of claim 4, wherein the at least one construct is selected from a group of constructs consisting of: a CASE construct and a COALESCE construct.

6. The computer program product of claim 1, wherein the data structure is a column oriented relational database.

7. The computer program product of claim 1, wherein the data structure is a table within a database.

8. The computer program product of claim 7, wherein the table is defined as column-major, and a column group of the table is stored as a block of the table, and wherein the clean data is stored as another block of the table.

9. The computer program product of claim 8, wherein the another block of the table is smaller in size than the block of the table.

10. The computer program product of claim 1, wherein the cleansing operation is an imputation operation to provide clean data for one or more positions within the data structure that are missing data values.

11. The computer program product of claim 1, wherein the cleansing operation is selected from a group of cleansing operations consisting of: imputation of missing data, correction of data, addition of data, replacement of data, modification of data, deletion of data, transformation of data, normalization of data, standardization of data and encoding of data.

12. A computer system for facilitating processing within a computing environment, the computer system comprising:
    a memory; and
    at least one device coupled to the memory, wherein the computer system is configured to perform a method, the method comprising:
        automatically performing, using a database management system, a cleansing operation on data of a data structure stored in the database management system to obtain clean data;
        storing, using the database management system, the clean data as part of the data structure, wherein the clean data and the data are stored in the data structure, and the clean data is stored in the data structure separately from the data stored in the data structure;

performing a mapping of the data and the clean data to provide a set of ordered data that includes the data and the clean data, the set of ordered data including a plurality of data positions, and wherein the mapping uses a map to select between the clean data and the data to be stored in a data position of the plurality of data positions of the set of ordered data; and providing the set of ordered data, the set of ordered data to be used in replying to query requests.

13. The computer system of claim 12, wherein the performing the mapping includes generating the map based on the data and the clean data to be used in the performing the mapping, wherein the map is a binary map in which one binary value in a particular position in the map indicates a data value from the data is to be selected and placed in that corresponding data position in the set of ordered data and another binary value at the particular position indicates a clean data value from the clean data is to be selected and placed in that corresponding data position in the set of ordered data.

14. The computer system of claim 12, wherein the performing the mapping includes using at least one construct to map the data and the clean data to provide the set of ordered data.

15. The computer system of claim 12, wherein the data structure is a table defined as column-major, and a column group of the table is stored as a block of the table, and wherein the clean data is stored as another block of the table.

16. A computer-implemented method of facilitating processing within a computing environment, the computer-implemented method comprising:

automatically performing, using a data management system, a cleansing operation on data of a data structure stored in the database management system to obtain clean data;

storing, using the database management system, the clean data as part of the data structure, wherein the clean data and the data are stored in the data structure, and the clean data is stored in the data structure separately from the data stored in the structure;

performing a mapping of the data and the clean data to provide a set of ordered data that includes the data and the clean data, the set of ordered data including a plurality of data positions, and wherein the mapping uses a map to select between the clean data and the data to be stored in a data position of the plurality of data positions of the set of ordered data; and providing the set of ordered data, the set of ordered data to be used in replying to query requests.

17. The computer-implemented method of claim 16, wherein the performing the mapping includes generating a map based on the data and the clean data to be used in the performing the mapping.

18. The computer-implemented method of claim 17, wherein the map is a binary map in which one binary value in a particular position in the map indicates a data value from the data is to be selected and placed in that corresponding data position in the set of ordered data and another binary value at the particular position indicates a clean data value from the clean data is to be selected and placed in that corresponding data position in the set of ordered data.

19. The computer-implemented method of claim 16, wherein the performing the mapping includes using at least one construct to map the data and the clean data to provide the set of ordered data.

20. The computer-implemented method of claim 16, wherein the data structure is a table defined as column-major, and a column group of the table is stored as a block of the table, and wherein the clean data is stored as another block of the table.

\* \* \* \* \*